United States Patent Office 3,017,719
Patented Jan. 23, 1962

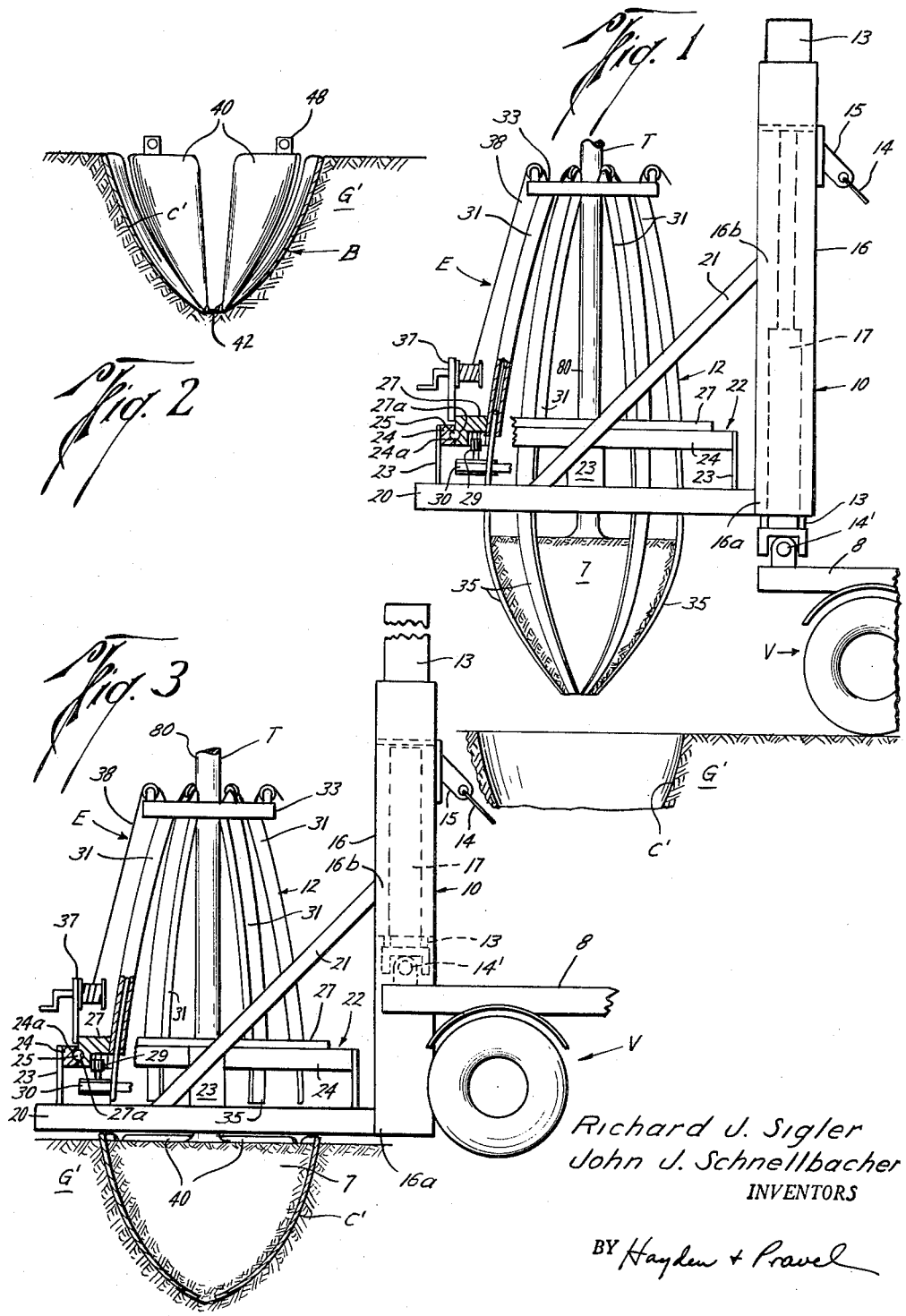

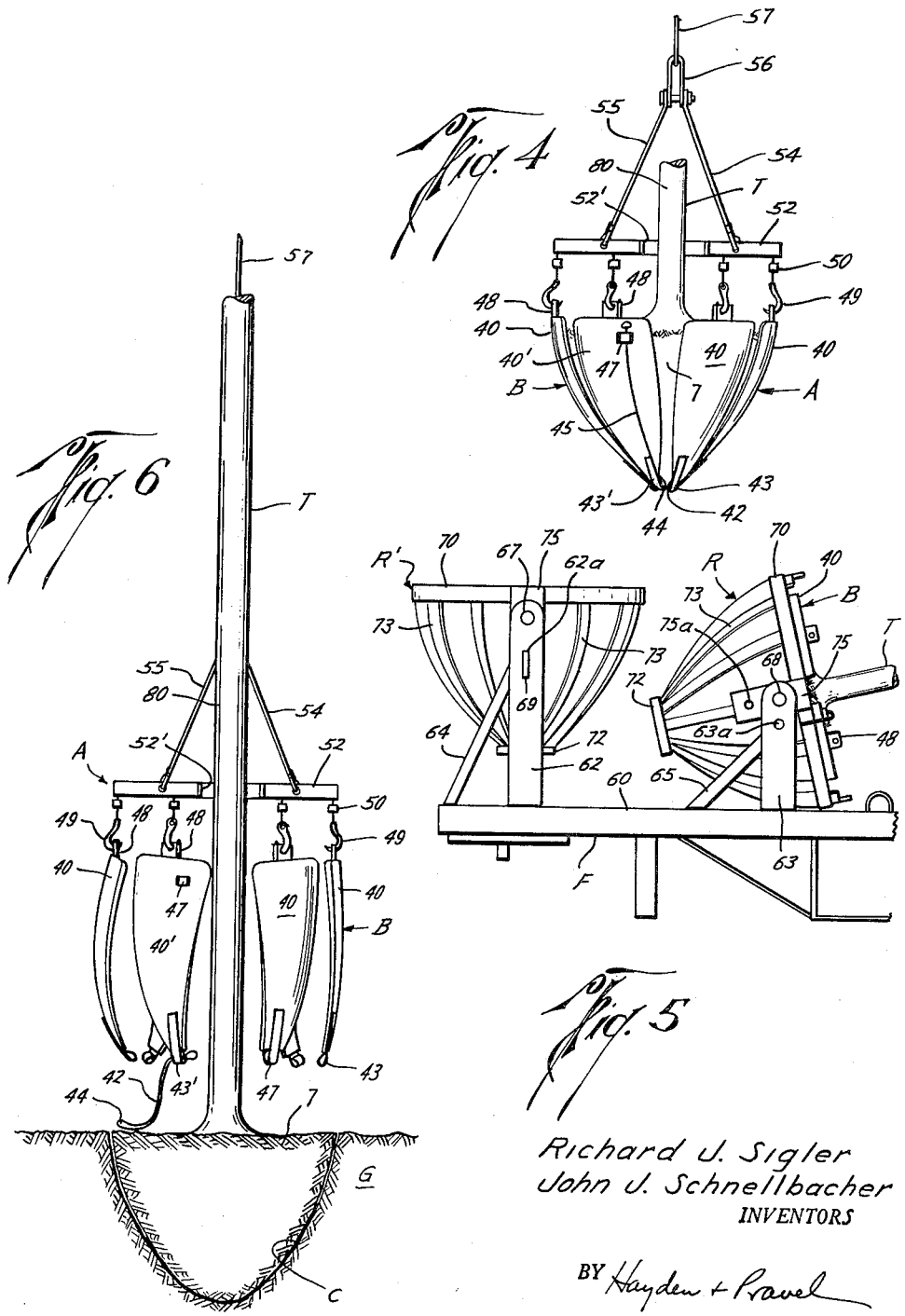

3,017,719
METHOD OF TRANSPLANTING TREES
Richard J. Sigler and John J. Schnellbacher, Houston, Tex., assignors, by mesne assignments, to Reed Roller Bit Company, Houston, Tex., a corporation of Texas
Filed Mar. 29, 1960, Ser. No. 18,377
10 Claims. (Cl. 47—58)

The present invention relates to new and improved methods of removing and transplanting trees or the like.

The present application is a continuation-in-part of prior copending application Serial No. 352, filed January 4, 1960, which is a continuation-in-part of prior copending application Serial No. 780,012, filed December 12, 1958, now abandoned.

The transplantation of trees, particularly those trees which have reached an appreciable size, has heretofore been a difficult, and generally an impossible endeavor. This is generally the result of damage to the trunk of the tree, the disarrangement and careless damage to the root structure adjacent the boles of the trees, and the relatively long exposure to air of the roots which, in turn, causes rapid oxidation and dehydration of the roots and resultant decay, and as a consequence, many trees fail to survive in their new locations after transplantation. However, the use of the instant method has been found to result in a high percentage of success relative to the previously known methods for tree transplantation.

An object of this invention is to provide a new and improved method for use in transplanting operations which is both expeditious and economical.

Another object of the present invention is to provide a new and improved method for use in transplanting trees or the like wherein the steps thereof may be performed with a minimum amount of labor or man-power.

An important object of the present invention is to provide a new and improved method of removing a tree or the like from the earth for the further purpose of transplanting such tree or the like, whereby harmful damage to the trunk and to the roots of the tree or the like is inhibited and wherein the section of earth surrounding the roots in substantially undisturbed.

A further object of the present invention is to provide a new and improved method whereby a growing tree may be removed from the ground, transported over land or highways to a pre-selected location for replanting, and replanted, all in a relatively short period of time.

This invention contemplates, as a still further object thereof the steps or functions, preferably in the sequential order set forth, as follows:

(a) To transport excavating apparatus to the site of transplantation;

(b) To excavate a substantially inverted ogive cavity in the ground or earth at the transplantation site;

(c) To transport the excavating apparatus to the locale of the tree to be transplanted;

(d) To effect circumscription of the excavating apparatus about the hole of the tree adjacent the roots thereof and normally loosely encompassing an upper portion of the tree trunk with extensions of the apparatus to provide support means therefor during the excavation operation and to support the upper end of the tree trunk as the tree is transported from its original location to the point of transplantation;

(e) To operate the excavating apparatus to drill an ogive shaped core of earth in the ground immediately surrounding the tree roots and to sever those roots thereof which extend exteriorly beyond the excavating apparatus;

(f) To elevate the core, tree trunk and roots as a unit from the ground;

(g) To transport the core, roots and tree trunk to the excavated site;

(h) To lower the core and roots encased therein into the aforementioned ogive cavity;

(i) To release the excavating apparatus from around the core and tree trunk; and, (j) To move the vehicle to a new site to initiate the excavation of a second cavity, if desired, after which the succeeding steps set forth above may again be sequentially performed.

While these outlined steps define the preferred procedure for effecting tree transplantation in accordance with this invention, the same may be varied without departing from the spirit and scope of the present invention, as will be more evident hereinafter.

Other objects and advantages of the present invention will become more readily apparent from a consideration of the following description and drawings wherein:

FIG. 1 is an elevation which schematically illustrates an earth digging machine of the type disclosed in the aforesaid applications Serial No. 352 and Serial No. 780,012 and which shows such machine in a raised position with a tree contained therein;

FIG. 2 is a sectional view illustrating the container segments as disclosed in application Serial No. 833,565 in position in an earth cavity;

FIG. 3 is a schematic view partly in elevation and partly in section similar to the view in FIG. 1 but showing the machine in a lowered position with the blades or knives in a raised position;

FIG. 4 is a side elevation of the apparatus disclosed in application Serial No. 833,565, illustrating the apparatus in a raised position with a tree contained therein;

FIG. 5 is a side elevation of the forward position of the tree float or trailer disclosed in application Serial No. 842,058 illustrating one receptacle in an empty position and another receptacle in a loaded position; and, FIG. 6 is a side elevation illustrating the apparatus as disclosed in application Serial No. 833,565 in a released position after the tree has been positioned in the earth cavity.

The method of the present invention may be preferably performed with an excavation machine of the type disclosed in applications Serial No. 352 and Serial No. 780,012, a tree moving apparatus of the type disclosed in application Serial No. 833,565, and a tree float or trailer of the type disclosed in application Serial No. 842,058. Although the present invention may be preferably performed with the types of devices enumerated hereinabove, other suitable types of devices may be used without departing from the scope of the invention. Further, in performing the various steps of the present invention, variations in the preferred sequence of steps may be made without departing from the scope of the invention.

In performing the method of the present invention, the site of transplantation of a tree is normally chosen first, after which at such site a hole or cavity C adapted to receive a tree T and its surrounding earth and root bole or ball 7 is bored or otherwise dug from the ground G by an excavation machine E or other suitable means. The earth or dirt removed from the cavity C may be disposed of as desired and one such method of disposal will be explained hereinafter. A tree T previously selected for transplantation in the cavity C is removed from the ground G' by means of the excavation machine E or other suitable means, placed in the tree moving apparatus A and then the container or bucket portion B of the apparatus A is positioned in one of the containers or receptacles R on the tree float or trailer F. The trailer F is then transported in a manner well known in the art to the site of transplantation after which the bucket portion B of the apparatus A containing the tree T is removed from the receptacle R and placed in the cavity C. The bucket portion B is then released from the earth ball or bole 7 leaving the tree T in the cavity C. After watering and smoothing out the earth of the bole 7 so as to more or less blend with the ground G, the transplanting of the tree T is complete. The details of the above overall method of transplanting a tree T will be explained hereinafter.

The excavation machine E as viewed in FIGS. 1 and 3 is a schematic illustration of a simplified form of the excavation machine disclosed in detail in application Serial No. 780,012, filed December 12, 1958, and its continuation-in-part application Serial No. 352, filed January 4, 1960. The machine E is preferably mounted on the rear platform or frame 8 of a vehicle (only the rear portion V being shown) and includes a raising and lowering mechanism designated generally at 10 and a main digging and portage frame designated generally at 12.

The mechanism 10 includes an internal support structure 13 which is pivotally mounted at 14' on the frame 8 and which may be tilted downwardly and to the right (as viewed in FIGS. 1 and 3) by tightening the cable 14 on a winch drum (not seen) or by other suitable means. The cable 14 is connected to a plate or bracket 15 which is rigidly secured to the internal support structure 13 by welding or other suitable means. An external vertical support structure 16 is slidably mounted on the support structure 13 and moved vertically up and down by means of a hydraulic lift 17 or other suitable means. As illustrated in FIG. 1 the structure or support 16 is in a raised position and as illustrated in FIG. 3 the support 16 is in a lowered position.

A platform 20 is rigidly secured to the lower end 16a of the support 16 and preferably at right angles thereto by welding or other suitable means and is also connected to the mid-portion 16b of the member 16 by the brace 21 by welding or other suitable means. A blade carriage support 22 is mounted on the platform 20 by means of the legs 23 spaced appropriately apart. The support 22 includes the circular support member 24 having a groove 24a therein for receiving the ring or bearing 25. A section (not seen) of the member 24 and the ring 25 is removable so as to permit the main digging and portage frame 12 to encircle a tree T. A blade carriage or riding member 27 is circular and has a groove 27a adapted to receive the ring 25 so as to move thereon. A gear 29 suitably connected to a drive shaft or power driven assembly 30 (only partially shown) is provided for driving or oscillating the member 27. A plurality of longitudinally extending box tubing members 31 or the like are secured to the internal surface of the circular riding member 27 by welding or other suitable means and are joined together at their upper ends by an annular ring 33. Both the annular ring 33 and the riding member 27 have a removable section (not shown) which permits the portage frame 12 to encircle a tree T.

Each of the box tubing members 31 contains a blade or knife 35 slidably positioned therein and which is raised or lowered by means of the winch 37 and the cable 38. The blades may also be lowered by gravity or a suitable power driven mechanism may be provided. The cable 38 is attached to the upper end of the blades 31 by any suitable means and the blades 31 may be raised or lowered individually or together as desired. The blades 31 also are curved so that when they reach their lowermost portion their lower ends will substantially meet.

The apparatus A as viewed in FIGS. 4 and 6 includes a plurality of substantially rigid segments 40 which are preferably made from steel or other suitable strong materials which are joined together at their lower ends by a cable 42 which is passed through the loops 43 on the lower ends of the segments 40, one end of which cable is attached or connected to a loop 43' on the segment 40' by clamping or other suitable means. The cable 42 has a loop or eye 44 on its free end, which is preferably formed by doubling the cable 42, which extends sufficiently through the loop 43' when each of the segments 40 and 40' are joined together and which is adapted to receive a rod 45 therethrough. The rod 45 is slidably mounted on the segment 40' in the bracket 47, and locks the segments 40 and 40' together at their lower ends when positioned in the bracket 47 and the loop 44 of the cable 42.

Each of the upper ends of the segments 40 and 40' has a loop or eye 48 secured thereto which is adapted to receive a hook 49 suspended from a chain 50 connected to a partial ring 52. The ring 52 has an opening 52' to permit the tree T to be positioned therein. Cables 54 and 55 are connected to the ring 52 and also to a shackle 56 which is suspended from a boom cable 57 connected to a standard boom well known in the art and not shown in the drawings.

In FIG. 5, a plurality of receptacles R are shown mounted on a trailer F in such manner that the receptacle R' which is nearest the vehicle pulling the trailer F is the highest and each succeeding receptacle R is somewhat lowered in a stair stepped relationship. The trailer F includes identical longitudinal frame members 60 on each side of the trailer F which are parallel to each other. Vertical support members 62 and 63 are mounted on the frame members 60 and perpendicular thereto so that the receptacles R' and R may be positioned between them, respectively. The members 62 and 63 may be additionally strengthened by support braces 64 and 65, respectively, and by any additional supporting or bracing means desired.

The receptacles R' and R are pivotally mounted on the members 62 and 63 at pivot pins 67 and 68, respectively, with the relationship of the weight of the receptacles R' and R and the pivot pins 67 and 68 such as will urge the receptacles R' and R to an inclined position as illustrated by the receptacle R in FIG. 5. Each of the mounting members has an opening 62a and 63a adapted to receive a locking pin 69. Only one locking pin may be used with each receptacle R or R' as desired.

The receptacles R' and R include an annular ring 70 which is jointed to a smaller annular ring 72 by a plurality of curved segments 73 by welding or other suitable means wherein a container or receptacle R or R' is formed. A mounting plate 75 is secured to each side of the receptacle R and R' by welding or other suitable means for pivotally connecting the receptacles R' and R with the pivot pins 67 and 68, respectively, to the side braces 62 and 63, respectively. The mounting plates 75 have openings 75a which correspond with the openings 63a or 62a when the receptacles R and R', respectively, are in vertical position and through which the pin 69 may be positioned thereby locking the receptacles R and R' in such vertical position.

It should be noted that in utilizing the various apparatus described above in the performance of the method of the present invention, there is preferably a distinct relationship between them. The apparatus A should be of such size that the container portion B when assembled as shown in FIG. 4 is of the approximate size of the inverted ogive cavity C or C' excavated by the machine E or of such size as to approximately conform to the shape of the earth section 7 excavated by the machine E. The receptacles R and R' are also of a similar approximate size so that they may readily and easily receive the container portion B with the tree T therein with little or no disturbance of the dirt around the roots of the tree T, as best seen in FIGS. 4 and 5.

In carrying out the method of this invention in the preferred manner, the site of transplantation is first selected, and then the excavation machine E is transported to such site in order that the cavity C may be dug from the ground G. Upon reaching the location of the site which has been chosen, the platform 20 is lowered to substantially ground contact and the cutting or digging machine 12 is actuated by the afore described driving mechanisms 30 and 37. As the blade carriage 27 is oscillated, the blades 31 move into the ground and circumscribe a cavity C. When the blades have reached their lowermost position, as seen in FIG. 1, the blade carriage mechanism is deactivated, and the platform is raised, thereby raising the section of earth from the ground and leaving a cavity C conforming to a specified shape, that is, the area defined by the rotating blades in their lowermost position. A section of earth from the cavity C may be disposed of as desired, one way being to drive the vehicle to a remote location and the earth is removed from the machine E and discarded. Also, the section of earth removed from the cavity C may be removed or handled and transported in a similar manner to the procedure or method for removing a tree as will be explained hereinafter.

The machine E is then taken to the site of the tree T which is to be moved. The removable sections (not seen) of the members 24, 27 and 33 are removed, and platform 20 is backed towards the tree until the trunk 80 is encircled by the annular ring 33. The several parts described above as being removed from the device are replaced in their operating positions, and the machinery is again activated. When the blades 35 have reached their lowermost positions thereby completely severing the section of earth 7 from the ground C' the platform 20 is raised to the position seen in FIG. 1.

If the cavity C in which the tree T is to be placed or positioned is reasonably close or within the same general area as cavity C' then the mechanism 10 would be tilted to the right as seen in FIG. 1 and the tree T would be taken to the prepared cavity C, whereupon the device is reversed thereby drawing the blades from around the tree and leaving the tree T embedded in its new location. The tree would then be watered, fertilized and the ground smoothed out as desired. If, on the other hand, the site of transplantation is relatively far from the area in which the tree is to be removed from the ground, the preferred method would be as follows: After the tree T is removed from the cavity C' and the platform 20 is raised to the position as shown in FIG. 1, the segments 40 of the apparatus A are connected together at their lower ends by the cable 42 as previously explained and placed in the cavity C', as shown in FIG. 2. This phase of the operation would normally be performed by hand. After the segments 40 have been placed in the cavity C', the platform 20 is lowered so that the section of earth 7 is again placed in the cavity C', but resting in the segments 40. The blades 35 are then withdrawn and the removable portions of the members 24, 27 and 33 are again removed, thereby permitting the machine E to be removed from around the tree T. The machine E is then moved to the next desired location for further transplanting duties. FIG. 3 best illustrates the replacing of the tree T in the cavity C' and in the container segments 40.

With the section of earth 7 resting in the cavity C' and in the container segments 40 and after the machine E has been removed, a standard boom (not seen) supporting the remaining portion of the apparatus A is moved into position so that the ring 52 encircles the trunk of the tree 80; the hooks 49 suspended from the ring 52 by the chains 50 are then attached to the loops 48 of the segments 40. With all of the chains 49 connected to the loops 48 of the segments 40, the apparatus A is ready to be removed from the cavity C'. The boom is operated in the usual manner and the apparatus A and the tree T therein is raised from the cavity C'. This position of the tree T in the apparatus A is best seen in FIG. 4 of the drawings.

The boom is then moved to a position wherein the bucket portion B of the apparatus A is directly over the opening in the receptacle R which is locked in a vertical position similarly to the receptacle R' in FIG. 5. The apparatus A is then lowered into the container or receptacle R and the chains 49 are removed from the loops 48 of the segments 40 and the upper portion of the apparatus A is removed from around the trunk 80 of the tree T. After the upper portion of the apparatus A has been removed from around the trunk 80 it may be disconnected from the cable 57 and the cable 57 may be attached to an upper part of the trunk 80 in any desired manner whereby the boom and cable 57 may be utilized to lower the trunk 80 and tree T to an approximately horizontal or lowered position (see FIG. 5) after the locking pin 69 has been withdrawn from its locking position. With the tree T and the receptacle R in the position shown in FIG. 5 the cable 57 is then removed from the trunk 80 for such other use as desired.

The tree T is preferably carried in such lowered position of the receptacle R because of the usual obstacles that one might encounter in city travel such as wires, underpasses and other similar obstructions. Additional trees may be placed in other receptacles on the trailer F in a similar manner depending of course upon the size of the trees and the corresponding size of the receptacles, and each of the other receptacles such as R' would be tilted to the inclined position similar to the receptacle R in FIG. 5. The receptacles R and R' might be left in a vertical position as illustrated by the receptacle R' if the trees contained in the receptacles are sufficiently short in height or if the receptacles merely contain earth and the like. The trailer F is particularly suited for transporting a plurality of trees over a relatively long distance, but may be used for short distances if desired.

The trailer F is transported to the site of transplantation and the procedure of placing the tree T in the container R is reversed. A boom is attached to the trunk 80 of the tree T, and the tree T is raised to a vertical position. After placing the pin 69 in locking position the cable 57 of the boom is removed. The apparatus A is then connected or joined together in the manner as set forth hereinabove in regard to removing a tree from a cavity. After the tree has been raised from the receptacle R by the boom, the boom is transported to the location of the cavity C and with the apparatus A and tree T in the position illustrated in FIG. 4 the apparatus A is positioned over the cavity C and then lowered into such cavity C.

With the tree T resting in the container portion B which in turn rests in the cavity C, the pin or rod 45 is removed from the bracket 47 and hence from the loop 43' thereby unlocking or releasing the cable 42. The apparatus A is then raised and the segments 40 are withdrawn from the ground G out of the cavity C with little or no disturbance of the section of earth 7 remaining in the cavity C. FIG. 6 illustrates the apparatus A in position immediately after the segments 40 have been removed from the cavity C. The boom may then be moved to a desired location and the apparatus A is removed from the tree T by such movement. The tree T may then be watered, fertilized and the ground or earth smoothed out or seemingly made to blend with the rest of the ground surface of the area, all as desired.

It should also be noted that the apparatus A can be used without the necessity of using the trailer or float F and even though the transplantation site is somewhat removed from the site from which the tree T was removed since a tree may be transported a relatively long distance in the apparatus A. Such tree must be carried in a substantially vertical position however, and this is usually not too desirable, and also only one tree at a time may be carried. The trailer F also permits a plurality of trees to be transported a relatively long distance in a rather short time. Using the method of the present invention, relatively large trees, including trees up to ten inches in diameter may be quickly and easily transplanted and/or transported with considerable ease and with very little manpower.

It can therefore be appreciated that the method of the present invention is highly desirable in the field of transplanting trees and the like and of removing sections of earth from the ground.

What is claimed is:

1. A method for transplanting trees, comprising the steps of, excavating a cavity of geometric configuration at the site of transplantation, enclosing said tree within an excavating machine having ground engaging blades adapted for vertical and rotary movement relative to the trunk of said tree, oscillating said blades laterally about a longitudinal axis to cut away the ground adjacent said trunk and effect a cutting of the roots therearound, enclosing said cut-away earth and said severed roots within said blades for lifting same from the ground, transporting said tree, roots and surrounding earth to said site by means of said excavating machine, and reversing said machine to withdraw said blades from said enclosing relationship relative to said tree and said roots in said surrounding earth whereby said tree is positioned at the site of transplantation.

2. A method for transplanting trees, comprising the steps of, cutting the earth surrounding said tree and severing the roots of said tree adjacent thereto and embedded therein, removing said tree, roots and earth from the ground wherein a cavity is formed, placing a substantially rigid container in said cavity, replacing said tree, roots and earth in said container, in said cavity, transporting said container and said tree, roots and earth contained therein to a previously prepared cavity at the site of transplantation for receiving said tree, roots and earth in said container, placing said container with said tree, roots and earth therein, in said cavity at the transplantation site, and removing said container from said last named cavity wherein said tree, roots and earth remain in said cavity.

3. A method for transplanting a tree, comprising the steps of, excavating a cavity at the site of transplantation, boring the earth surrounding said tree and severing the roots adjacent to and embedded therein, enclosing said surrounding earth and said severed roots within the means for effecting said boring and severing operations and raising said earth and roots from the ground leaving a hole therein, placing a container formed of a plurality of substantially rigid segments connected together at their lower end portions into said hole, lowering said tree, earth and roots into said container in said hole, transporting said container and said tree, roots and earth contained therein to said site of transplantation, placing said container and said tree, roots and earth contained therein in said cavity, releasing said lower end portions of said segments of said container, and removing said container from around said tree, earth and roots without disturbing same and thereby completing the transplanting of said tree.

4. A method for removing and transplanting a tree, comprising the steps of enclosing said tree within an excavation machine having ground engaging blades adapted for vertical and rotary movement relative to the trunk of said tree, effecting operation of said blades to cut away a section of earth adjacent said trunk and effect a cutting of the roots therearound, enclosing said section of earth and said severed roots within said blades for lifting same from the ground, lifting said section of earth, roots and tree thereby leaving a cavity in the ground, placing a container formed of a plurality of segments connected together at their lower end portions into said cavity, lowering said section of earth, roots and tree into said container in said cavity, transporting said container and said section of earth, roots and tree contained therein to a hole previously prepared for receiving said container and the contents thereof, placing said container and said section of earth, roots and tree contained therein in said hole, releasing said lower end portions of said segments of said container, and removing said container from around said section of earth, roots and tree without removing said section of earth, roots and tree from said hole.

5. A method for transplanting a tree, comprising the steps of, boring the earth surrounding said tree and severing the roots of said tree adjacent thereto and embedded therein with an excavating machine having ground engaging blades adapted for vertical and rotary movement relative to the trunk of said tree, raising said tree, earth and roots from the ground thereby leaving a cavity, placing a container formed of a plurality of segments with their lower ends connected together into said cavity, placing said tree, earth and roots in said container in said cavity, removing said container and said tree, earth and roots therein from said cavity and placing said container and the contents thereof in a second container adapted to receive said first container, transporting said containers and the contents thereof to the site of transplantation, removing said first container and said tree, earth and roots therein from said second container, placing said first container and said tree, earth and roots therein into a hole previously prepared for receiving said container and the contents thereof, and removing said container from said hole without removing said tree, earth and roots, wherein said tree is transplanted.

6. A method for transplanting a tree, comprising the steps of, boring the earth surrounding said tree and severing the roots of said tree adjacent thereto and embedded therein with an excavating machine having ground engaging blades adapted for vertical and rotary movement relative to the trunk of said tree, raising said tree, earth and roots from the ground thereby leaving a cavity, placing a container formed of a plurality of segments with their lower ends connected together into said cavity, placing said tree, earth and roots in said container in said cavity, removing said container and said tree, earth and roots therein from said cavity and placing said container and the contents thereof in a pivotally mounted second container adapted to receive said first container, pivoting said second container from an approximately vertical position to an approximately horizontal position whereby said tree may be transported in an approximately horizontal position, transporting said containers and the contents thereof to the site of transplantation, removing said first container and said tree, earth and roots therein from said second container, placing said first container and said tree, earth and roots therein into a hole previously prepared for receiving said container and the contents thereof, and removing said container from said hole without removing said tree, earth and roots, wherein said tree is transplanted.

7. A method for transplanting a tree, comprising the steps of, placing said tree, the earth surrounding said tree, and the roots of said tree embedded therein, into a container formed of a plurality of segments connected together substantially at their lowermost ends whereby the lowermost ends are held substantially close together, transporting said container to a previously prepared cavity of approximately the same size as said container at the site of transplantation, placing said container and said tree, earth and roots contained therein into said cavity, releasing the lowermost ends of said segments, and removing said container from around said tree, earth and roots without removing said tree, earth and roots from said cavity thereby effectively planting said tree.

8. A method for transplanting a tree, comprising the steps of, placing said tree, the earth surrounding said tree, and the roots of said tree embedded therein, into a container of approximately the same size as the hole in which said tree is to be transplanted, placing said container and the contents thereof in a second container of approximately the same size as said first container and mounted on a vehicle and adapted to receive said first container, transporting said containers and the contents thereof to the site of transplantation, removing said first container and said tree, earth and roots therein from said second container, placing said first container and said tree, earth and roots therein into a hole of approximately the same size as said first container and which was previously prepared for receiving said container and the contents thereof, and removing said container from said hole without removing said tree, earth and roots, wherein said tree is transplanted.

9. A method for transplanting a tree, comprising the steps of, placing said tree, the earth surrounding said tree, and the roots of said tree embedded therein, into a container formed of a plurality of segments connected together at their lower ends whereby the lower ends are held substantially close together, placing said container and the contents thereof in a second container of approximately the same size as said first container and mounted on a vehicle and adapted to receive said first container, transporting said containers and the contents thereof to the site of transplantation, removing said first container and said tree, earth and roots therein from said second container, placing said first container and said tree, earth and roots therein into a hole of approximately the same size as said first container and which was previously prepared for receiving said container and the contents thereof, releasing the lower ends of said segments, and removing said container from said hole without removing said tree, earth and roots, wherein said tree is transplanted.

10. A method for removing and transplanting a tree, comprising the steps of enclosing said tree within an excavation machine having ground engaging blades adapted for vertical movement along and rotary movement about a substantially vertical axis relative to the trunk of said tree, effecting operation of said blades to cut away a section of earth adjacent said trunk and effect a cutting of the roots therearound, enclosing said section of earth and said severed roots within said blades for lifting same from the ground, lifting said section of earth, roots and tree from the ground and transporting the same to a hole previously prepared for receiving the same, placing the same in said hole, and removing said blades.

References Cited in the file of this patent

UNITED STATES PATENTS

| | | |
|---|---|---|
| 594,668 | Wilkens | Nov. 30, 1897 |
| 1,139,735 | Spuhr | May 18, 1915 |
| 2,729,493 | Engel | Jan. 3, 1956 |
| 2,769,278 | Wassell | Nov. 6, 1956 |
| 2,775,428 | Monthan | Dec. 25, 1956 |
| 2,850,842 | Eubank | Sept. 9, 1958 |

OTHER REFERENCES

Farmers; Bulletin No. 1591, "Transplanting Trees and Shrubs," published 1929 by U.S. Department of Agriculture. Pages 21 through 34 relied on.